US010166733B2

(12) United States Patent
Smeltzer

(10) Patent No.: US 10,166,733 B2
(45) Date of Patent: Jan. 1, 2019

(54) EXPANSION CONTROL DEVICE AND TIRE MOLD USING SAME

(71) Applicant: Bridgestone Americas Tire Operations, LLC, Nashville, TN (US)

(72) Inventor: Edward L. Smeltzer, Ashland, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/951,594

(22) Filed: Apr. 12, 2018

(65) Prior Publication Data

US 2018/0297307 A1   Oct. 18, 2018

Related U.S. Application Data

(60) Provisional application No. 62/486,265, filed on Apr. 17, 2017.

(51) Int. Cl.
B29D 30/06 (2006.01)

(52) U.S. Cl.
CPC ...... B29D 30/0645 (2013.01); *B29D 30/0606* (2013.01); *B29D 2030/0618* (2013.01)

(58) Field of Classification Search
CPC ............ B29D 30/0605; B29D 30/0606; B29D 30/0629; B29D 2030/063
See application file for complete search history.

(56) References Cited

U.S. PATENT DOCUMENTS

| | | | | |
|---|---|---|---|---|
| 1,600,586 A | * | 9/1926 | Hatfield | B29D 30/0629 425/46 |
| 2,030,861 A | * | 2/1936 | Fisher | B29D 30/54 425/22 |
| 2,372,216 A | * | 3/1945 | MacMillan | B29D 30/54 425/20 |
| 2,723,425 A | | 11/1955 | Mattox et al. | |
| 2,840,857 A | * | 7/1958 | Lett | B29D 30/54 425/195 |
| 3,276,930 A | * | 10/1966 | Keefe, Jr. | B29D 30/0601 156/130 |
| 3,839,123 A | | 10/1974 | Sausaman | |
| 3,933,553 A | | 1/1976 | Seiberling | |
| 3,997,284 A | | 12/1976 | MacMillan | |
| 3,999,907 A | * | 12/1976 | Pappas | B29D 30/0629 425/20 |
| 4,148,681 A | | 4/1979 | Collins et al. | |
| 4,669,964 A | | 6/1987 | Amano et al. | |
| 4,946,554 A | * | 8/1990 | Magee | B29D 30/54 156/394.1 |
| 5,208,044 A | * | 5/1993 | Miyata | B29C 33/202 425/32 |
| 5,324,375 A | | 6/1994 | Kim et al. | |
| 5,342,462 A | * | 8/1994 | King | B29C 33/301 156/128.1 |
| 5,492,464 A | * | 2/1996 | Irie | B29C 33/202 425/34.1 |
| 5,653,847 A | * | 8/1997 | King | B29C 33/301 156/421.6 |

(Continued)

*Primary Examiner* — James P Mackey

(57) ABSTRACT

A segmented tire mold includes a device for controlling the expansion of the mold segments during the vulcanization of a tire. The expansion control device may be a cable or a ring that is wrapped around the outer circumference of the segmented tire mold and placed into tension in order to retain the mold segments in the proper position while the tire is vulcanized.

10 Claims, 9 Drawing Sheets

(56) References Cited

U.S. PATENT DOCUMENTS

| | | | |
|---|---|---|---|
| 6,607,373 B2 | 8/2003 | Chamoy | |
| 6,632,393 B2 * | 10/2003 | Fike | B29D 30/065 264/297.5 |
| 6,824,724 B2 | 11/2004 | Mori et al. | |
| 6,949,213 B1 * | 9/2005 | Kata | B29D 30/0629 264/326 |
| 2003/0132550 A1 * | 7/2003 | Oobayashi | B29C 33/44 264/326 |
| 2004/0026831 A1 * | 2/2004 | Steidl | B29D 30/0662 264/326 |
| 2009/0008024 A1 * | 1/2009 | Marchini | B29C 43/021 156/110.1 |
| 2012/0111464 A1 * | 5/2012 | Kimiya | B29D 30/0601 152/209.1 |

* cited by examiner

EXPANSION CONTROL DEVICE AND TIRE MOLD USING SAME

CROSS-REFERENCE TO RELATED APPLICATIONS

This application claims priority from U.S. Provisional Patent Application No. 62/486,265, filed on Apr. 17, 2017, which is incorporated by reference herein in its entirety.

BACKGROUND

A pneumatic tire may be vulcanized in a tire mold that is segmented. Each mold segment may be responsible for molding a portion of an outer surface of the tire. The mold segments may be arranged radially and/or circumferentially such that when assembled, the mold segments collectively form a surface for molding the complete outer surface of the tire.

Segmented tire molds may require a backing ring that holds each of the mold segments in place during vulcanization of the tire. The purpose of the backing ring may be to prevent the mold segments from expanding (i.e., being displaced in a radial direction) in response to an expansion of the tire in the mold during vulcanization.

Different sizes of tires may require different sizes of molds, which in turn may require different sizes of backing rings. Tire manufacturers may thus be burdened with production and storage costs that are directly proportional to the number of different sizes of backing rings that are required. Tire manufacturers that produce a large number of different sizes of tires may be burdened with high manufacturing costs as a result of the need to maintain a large inventory of different sizes of backing rings.

What is needed is a more cost effective solution for controlling the expansion of mold segments during the vulcanization of a pneumatic tire.

SUMMARY

In one embodiment, a mold device for molding a pneumatic tire is provided, the mold device comprising: a segmented tire mold comprising a plurality of mold segments each having a radially inner surface and a radially outer surface, wherein the radially inner surface of each mold segment has a molding surface; and at least one expansion control device having a radially inner surface; wherein the radially inner surface of the expansion control device is oriented circumferentially around, and radially-outwardly of, the radially outer surface of the mold segments, wherein the expansion control device applies a force radially inwardly to the mold segments, and wherein the expansion control device is a cable.

In another embodiment, a mold device for molding a pneumatic tire is provided, the mold device comprising: a segmented tire mold comprising a plurality of mold segments each having a radially inner surface and a radially outer surface, wherein the radially inner surface of each mold segment has a molding surface; and at least one expansion control device having a radially inner surface; wherein the radially inner surface of the expansion control device is oriented circumferentially around, and radially-outwardly of, the radially outer surface of the mold segments, wherein the expansion control device applies a force radially inwardly to the mold segments, and wherein the expansion control device is at least one ring.

In another embodiment, a mold device for molding a pneumatic tire is provided, the device comprising: a segmented tire mold comprising a plurality of mold segments each having a radially inner surface and a radially outer surface, wherein the radially inner surface of each mold segment has a molding surface; at least one expansion control device having a radially inner surface; and at least one tension bladder having a radially inner surface and a radially outer surface; wherein the radially inner surface of the tension bladder is oriented circumferentially around, and radially-outwardly of, the radially outer surface of the mold segments, wherein the radially inner surface of the expansion control device is oriented circumferentially around, and radially-outwardly of, the radially outer surface of the tension bladder, wherein the expansion control device applies a force radially inwardly to the mold segments, wherein the tension bladder is configured to expandable in volume, wherein expansion in volume of the tension bladder places the expansion control device in tension, and wherein the expansion control device is at least one of: a cable and a ring.

BRIEF DESCRIPTION OF THE DRAWINGS

The accompanying figures, which are incorporated in and constitute a part of the specification, illustrate various example embodiments, and are used merely to illustrate various example embodiments. In the figures, like elements bear like reference numerals.

DETAILED DESCRIPTION

Figure 1:
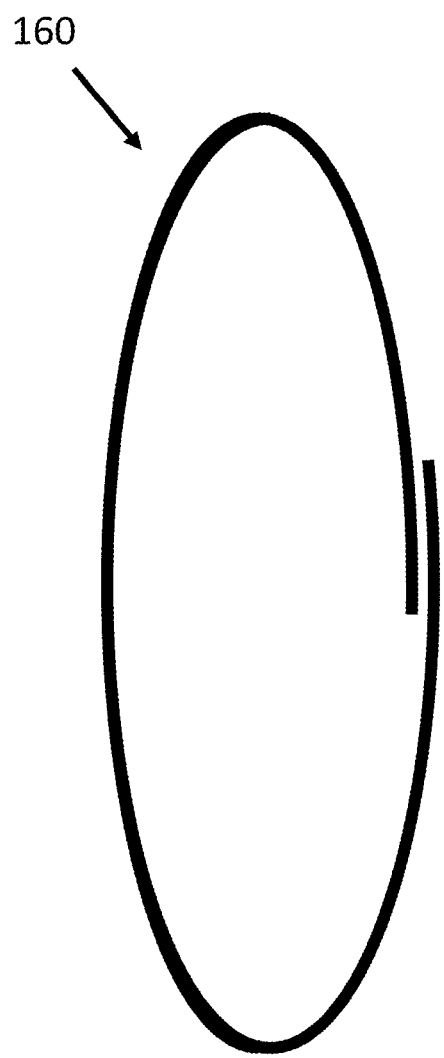
FIG. 1 illustrates a perspective view of a first embodiment of an expansion control device.

FIG. 1 illustrates a perspective view of an example embodiment of an expansion control device 160 for a segmented tire mold (not shown). Expansion control device 160 may be a cable. Expansion control device 160 may be a plurality of cables. Expansion control device 160 may encircle a segmented tire mold (not shown) at least once. Expansion control device 160 may encircle a segmented tire mold (not shown) multiple times. Expansion control device 160 may include a ring-shaped member having a substantially circular cross-section.

The cable may be a wire rope material, formed from a plurality of smaller-diameter filaments, woven, braided, and/or twisted together to form a larger diameter cable. The cable may be formed from any of a variety of materials, including for example, a metal, an alloy, a composite, a natural material, or any material that provides sufficient mechanical properties (e.g., a tensile strength, a corrosion resistance, a thermal resistance, a thermal expansion coefficient, and the like). The cable may be a solid material, formed from a single filament of any of a variety of materials, as noted above. Expansion control device 160 may be constructed from either a carbon steel or a stainless steel (e.g., a steel cable, a steel plate, and the like). Expansion control device 160 may be constructed from an aluminum, a copper, a titanium, and the like.

Figure 2:
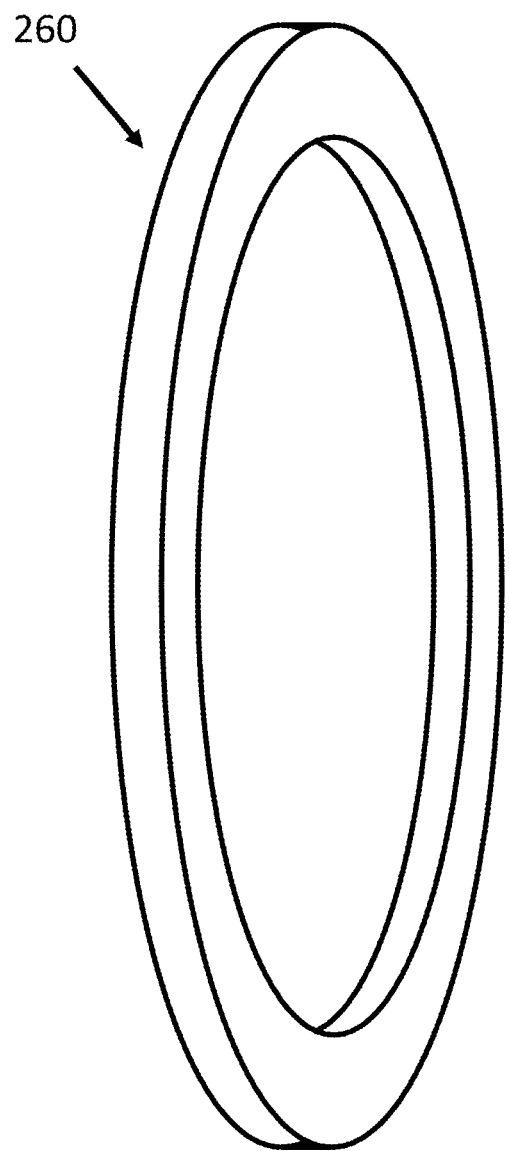
FIG. 2 illustrates a perspective view of a second embodiment of an expansion control device.

FIG. 2 illustrates a perspective view of an example embodiment of an expansion control device 260 for a segmented tire mold (not shown). Expansion control device 260 may be a ring/annulus. Expansion control device 260 may be a plurality of rings. Expansion control device 260 may be a plurality of rings oriented axially adjacent to one another. Each ring may encircle a segmented tire mold (not shown) completely.

Expansion control device 260 may be constructed from a metal, an alloy, a composite, a natural material, or any material that provides sufficient mechanical properties (e.g., a tensile strength, a corrosion resistance, a thermal resistance, a thermal expansion coefficient, and the like). Expansion control device 260 may be constructed from either a carbon steel or a stainless steel (e.g., a steel cable, a steel plate, and the like). Expansion control device 260 may be constructed from an aluminum, a copper, a titanium, and the like.

Expansion control device 160, 260 may have an inner diameter (e.g., if expansion control device 160, 260 is substantially rigid), or may be capable of forming an inner diameter (e.g., if expansion control device 160, 260 is not rigid), that is large enough to allow expansion control device 160, 260 to be placed circumferentially around (and radially-outwardly of) an outer surface of the segmented tire mold (not shown). Expansion control device 160, 260 may have a radially inner surface and a radially outer surface. The radially inner surface may coincide with the inner diameter. The radially outer surface may coincide with an outer diameter.

Expansion control device 260 may be a ring constructed from a metal plate. Metal plate, as a raw material, may be inexpensive relative to a traditional segmented mold backing ring, which may be cast, forged, machined, laser sintered, or otherwise fabricated from metallic raw materials. Expansion control device 260 may be fabricated from a metal plate by cutting a hole in the plate, wherein the diameter of the hole is the inner diameter of expansion control device 260. One or more expansion control device 260 rings may be placed around the segmented tire mold. One or more expansion control device 260 rings may be placed around the segmented tire mold and oriented axially adjacent to one another.

If expansion control device 160, 260 is rigid, it may be placed around the segmented tire mold, such as by sliding expansion control device 160, 260 over the outer surface of the segmented tire mold. If expansion control device 160, 260 is not rigid, it may be wrapped around the segmented tire mold, such as by circumferentially winding expansion control device 160, 260 around the outer surface of the segmented tire mold (e.g., similar to a thread wound on a spool, or a hose wound on a reel). Particularly, where expansion control device 160 is a cable, it may be wrapped our wound around the outer surface of the segmented tire mold. Expansion control device 160 may be wrapped around the segmented tire mold at least one revolution.

Expansion control device 160, 260 may be placed around the segmented tire mold to prevent the mold segments from moving radially outward when a green tire is being vulcanized in the mold. Expansion control device 160, 260 may be placed around the segmented tire mold to substantially prevent the mold segments from moving radially-outward when a green tire is being vulcanized in the mold, as it may not be possible to completely prevent the mold segments from moving radially-outward when a green tire is being vulcanized in the mold.

When a green tire is vulcanized, the green tire may be placed in a segmented tire mold and subjected to elevated temperatures and pressures while a bladder is inflated within the green tire, thereby forcing the green tire radially-outward against a radially inner surface of the mold segments. During this vulcanization process, the bladder may ensure that the green tire is molded into the proper size and shape. Expansion control device 160, 260 may resist the expansion of the bladder, as well as the elevated temperatures and pressures of the vulcanization process, and prevent the mold segments from moving (i.e., expanding) during vulcanization of the tire. Expansion control device 160, 260 may prevent the mold segments from moving (i.e., expanding) radially outward during vulcanization of the tire.

In order to prevent the expansion of the mold segments during vulcanization of the tire, expansion control device 160, 260 may require a sufficient tensile strength. In order to achieve the sufficient tensile strength, expansion control device 160, 260 may be constructed from a selection of appropriate materials, as guided by accepted engineering principles and/or practices.

In one embodiment, expansion control device 160, 260 may be designed to resist a bladder expansion force resulting from the bladder expansion pressure. The bladder expansion pressure may be about 200 psi (about 1.38 MPa). The bladder expansion pressure may be about 300 psi (about 2.07 MPa). The bladder expansion pressure may be about 400 psi (about 2.76 MPa). The bladder expansion pressure may be about 500 psi (about 3.45 MPa). The bladder expansion pressure may be between about 100 psi (about 0.689 MPa) and about 800 psi (about 5.52 MPa). The bladder expansion pressure may be any pressure required to mold the green tire into the proper size and shape in accordance with accepted mold design principles and/or practices.

In one embodiment, expansion control device 160, 260 may be designed to resist a bladder expansion force by a factor of safety that exceeds the bladder expansion force. The factor of safety may be greater than 1.0. For example, the factor of safety may be about 1.5 such that expansion control device 160, 260 may be designed to resist a force that is 1.5 times greater than the bladder expansion force. The factor of safety may be about 2.0. The factor of safety may be any factor greater than 1.0 in accordance with accepted engineering principles and/or practices.

Additionally, expansion control device 160, 260 may be configured in various ways in order to achieve the desired tensile strength. For example, if expansion control device 160, 260 is a cable, various properties of the cable may be selected to ensure that expansion control device 160, 260 has the sufficient tensile strength for preventing the expansion of the mold segments. Such properties of the cable may include: a material, a construction geometry, a diameter, a length, a tensile strength, a number of windings around the segmented tire mold, and the like. Furthermore, expansion control device 160, 260 may be wrapped around the segmented tire mold and tightened (e.g., by a hand, by a wrench, by a winch, or by any other device that provides a mechanical advantage) to a tension and force calculated to prevent expansion of the mold segments. If expansion control device 160, 260 is a ring, such properties of the ring may include:

a material, a thickness, a diameter, a tensile strength, a number of rings to be placed around the segmented tire mold, and the like.

In one embodiment, expansion control device 160, 260 may be engineered to have a tensile strength that allows expansion control device 160, 260 to prevent the expansion of the mold segments. The magnitude of a force with which the mold segments may expand may be determined by accepted mold design principles and/or practices, and as such, the force may vary in magnitude greatly depending upon the size, shape, or other characteristics of a particular mold design. For example, a hypothetical tire mold may require an expansion control device 160, 260 that is engineered to apply a radially inward pressure of about 17,000 psi (about 117 MPa). Likewise, a hypothetical tire mold may require an expansion control device 160, 260 that is engineered to apply a radially inward force that exceeds by a factor of safety the force with which the mold segments may expand. The design and construction of expansion control device 160, 260 may be dictated by the requirements of the particular mold with which expansion control device 160, 260 may be used.

In one embodiment, expansion control device 160, 260 may be engineered to resist elevated temperatures for a particular duration of time, such as those temperatures and durations required to vulcanize green rubber. For example, expansion control device 160, 260 may be engineered to resist temperatures exceeding about 200° F. (about 93° C.) for a duration of at least about 4 hours. Likewise, expansion control device 160, 260 may be engineered to resist temperatures exceeding about 400° F. (about 204° C.) for a duration of at least about 12 hours. Expansion control device 160, 260 may be engineered to resist any temperature for any duration of time required to safely vulcanize green rubber in accordance with accepted engineering principles and/or practices.

Figure 3:
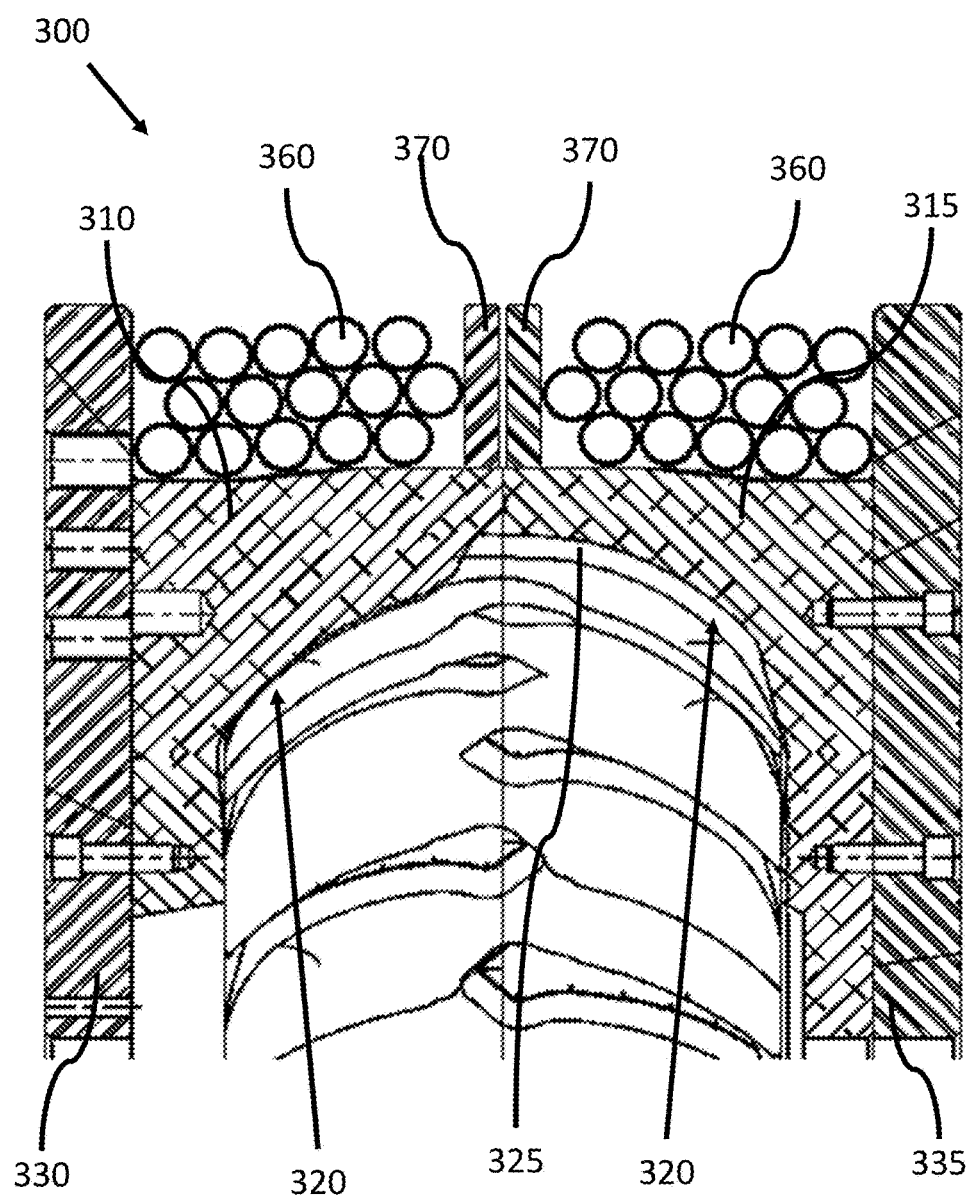
FIG. 3 illustrates a sectional view of a first embodiment of a mold device.

FIG. 3 illustrates a sectional view of a mold device 300. Mold device 300 may be configured to mold a tire (not shown). Mold device 300 may be a segmented tire mold. The tire may be a pneumatic tire. The tire may be a passenger tire. The tire may be an agricultural tire, an off the road tire, a truck and bus tire, or any other tire capable of being molded in a segmented tire mold.

Mold device 300 may be a segmented tire mold comprising a plurality of mold segments, each mold segment having a radially inner surface and a radially outer surface.

Mold device 300 may have a first axial half 310 and a second axial half 315. Each of first axial half 310 and second axial half 315 may have a radially inner surface 320 configured to shape a green tire during vulcanization. Radially inner surface 320 may comprise a molding surface. Radially inner surface 320 may be a molding surface. The molding surface may be configured to mold the outer surfaces of a tire. Each radially inner surface 320 may have at least one surface feature 325 for molding specific shapes, contours, tread features, and the like into the tire. First axial half 310 and second axial half 315 may be configured to mate such that an inner cavity is created by radially inner surfaces 320.

Mold device 300 may have a first side plate 330 oriented axially outward of first axial half 310. Mold device 300 may have a second side plate 335 oriented axially outward of second axial half 315. Each of first side plate 330 and second side plate 335 may secure mold device 300 such that first axial half 310 and second axial half 315 are prevented from moving (e.g., expanding) in an axial direction while the green tire is vulcanized.

To prevent radially outward movement of first axial half 310 and second axial half 315, mold device 300 may have at least one expansion control device 360. Expansion control device 360 may prevent each of first axial half 310 and second axial half 315 from moving in a radially outward direction during tire vulcanization. Expansion control device 360 may substantially prevent each of first axial half 310 and second axial half 315 from moving in a radially outward direction during tire vulcanization. Where first axial half 310 and second axial half 315 each comprise a plurality of mold segments, expansion control device 360 may prevent the plurality of mold segments from moving in a radially-outward direction after installation of expansion control device 360 and/or during tire vulcanization.

Expansion control device 360 may be a cable. Expansion control device 360 may be a plurality of cables. Expansion control device 360 may be a cable wound about an outer surface of mold device 300. Expansion control device 360 may be constructed from a metal, an alloy, a composite, or any material that provides sufficient mechanical properties (e.g., a tensile strength, a corrosion resistance, a temperature resistance, a thermal expansion coefficient, and the like). Expansion control device 360 may be constructed from either a carbon steel or a stainless steel (e.g., a steel cable). Expansion control device 360 may be constructed from an aluminum, a copper, a titanium, and the like. In one embodiment, two expansion control devices 360 may be included, with one each engaging first and second axial halves 310, 315.

Expansion control device 360 may be capable of forming an inner diameter that is large enough to allow expansion control device 360 to be placed circumferentially around an outer surface of the segmented tire mold. Expansion control device 360 may be capable of forming an inner diameter that is large enough to allow expansion control device 360 to be placed circumferentially around an outer surface of each of first axial half 310 and second axial half 315.

Expansion control device 360 may be wrapped around the segmented tire mold, such as by circumferentially winding expansion control device 360 around the outer surface of the segmented tire mold at least one revolution (e.g., similar to a thread wound on a spool, or a hose wound on a reel). Expansion control device 360 may be wrapped around each of first axial half 310 and second axial half 315. One expansion control device 360 may be wrapped around first axial half 310 and a second expansion control device 360 may be wrapped around second axial half 315.

Expansion control device 360 may be placed around the segmented tire mold. The radially inner surface of expansion control device 360 may be oriented circumferentially around, and radially-outwardly of, the radially outer surface of the mold segments. Expansion control device 360 may have a first portion and a second portion. The first portion of expansion control device 360 may be placed around first axial half 310. The second portion of expansion control device 360 may be placed around second axial half 315. Expansion control device 360 may prevent the mold segments from moving radially outward when a green tire is being vulcanized in the mold. Expansion control device 360 may resist an expansion of a bladder (not shown), as well as the elevated temperatures and pressures of the vulcanization process, and prevent the mold segments from moving (i.e., expanding) during vulcanization of the tire.

In order to prevent the expansion of the mold segments during vulcanization of the tire, expansion control device 360 may require a sufficient tensile strength. In order to achieve the sufficient tensile strength, expansion control device 360 may be constructed from a selection of appropriate materials, as guided by accepted engineering principles.

Additionally, expansion control device 360 may be configured in various ways in order to achieve the desired tensile strength. For example, when expansion control device 360 is a cable, various properties of the cable may be selected to ensure that expansion control device 360 has the sufficient tensile strength for preventing the expansion of the mold segments. Such properties of the cable may include: a material, a construction geometry, a diameter, a length, a number of windings around the segmented tire mold, and the like. Furthermore, expansion control device 360 may be wrapped around the segmented tire mold and tightened (e.g., by a hand, by a wrench, by a winch, or by any other device that provides a mechanical advantage) to a tension or force calculated to prevent expansion of the mold segments.

Expansion control device 360 may have at least one retaining ring 370. Retaining ring 370 may be oriented circumferentially around a radially outer surface of the segmented tire mold. A first retaining ring 370 may be oriented circumferentially around the radially outer surface of first axial half 310. A second retaining ring 370 may be oriented circumferentially around the radially outer surface of first axial half 315.

Retaining ring 370 may be oriented axially inward of each portion of expansion control device 360, such that a first portion of expansion control device 360 is oriented axially between retaining ring 370 and first side plate 330, and a second portion of expansion control device 360 is oriented axially between retaining ring 370 and second side plate 335. Retaining ring 370 may aid in axially securing expansion control device 360 by preventing expansion control device 360 from moving in an axial direction during vulcanization of the green tire.

Retaining ring 370 may be constructed from a metal, an alloy, a composite, or any material that provides sufficient mechanical properties (e.g., a tensile strength, a corrosion resistance, a temperature resistance, a thermal expansion coefficient, and the like). Retaining ring 370 may be constructed from either a carbon steel or a stainless steel (e.g., a steel plate). Retaining ring 370 may be constructed from an aluminum, a copper, a titanium, and the like.

Figure 4:
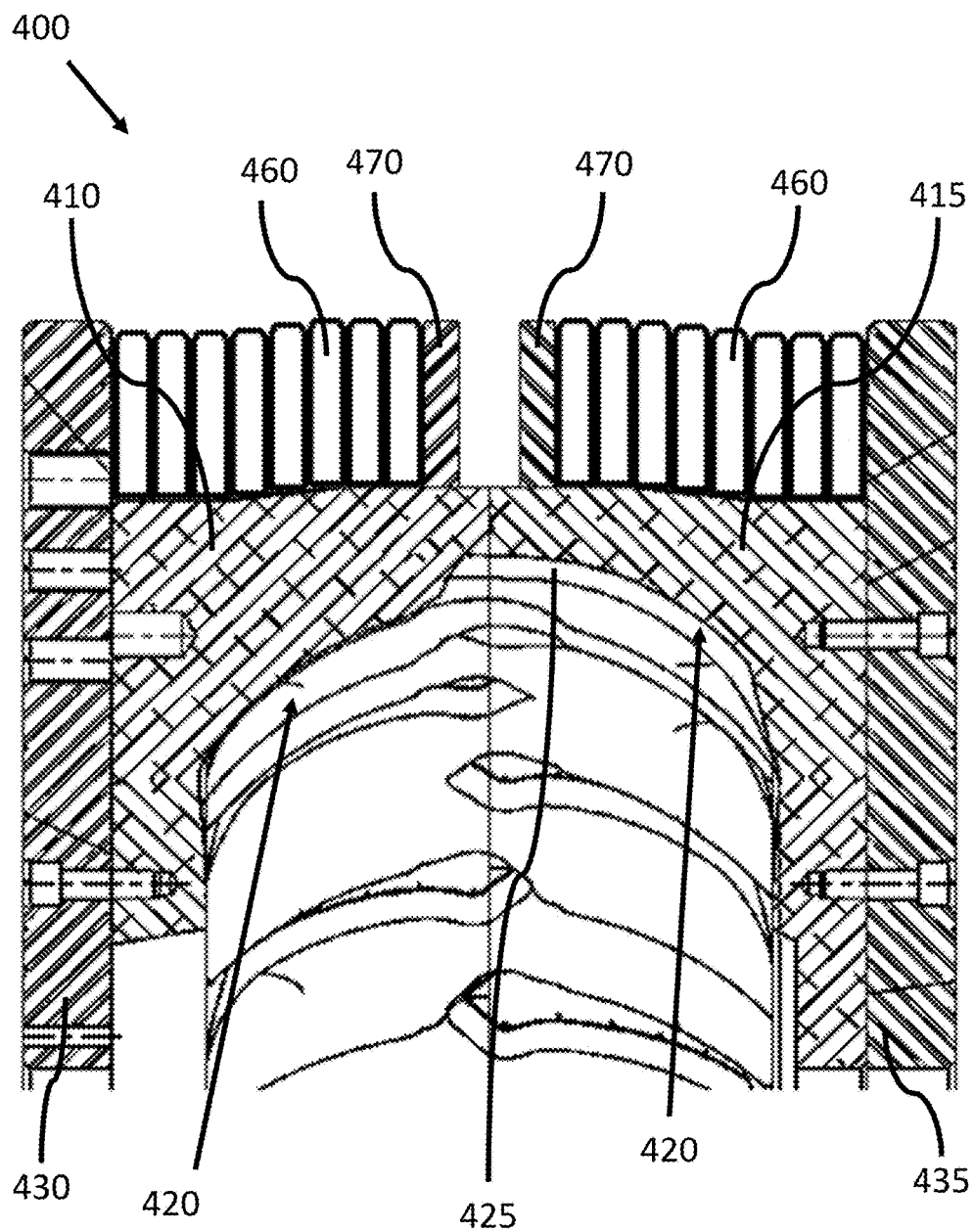
FIG. 4 illustrates a sectional view of a second embodiment of a mold device.

FIG. 4 illustrates a sectional view of a mold device 400. Mold device 400 may be configured to mold a tire (not shown). Mold device 400 may be a segmented tire mold. The tire may be a pneumatic tire. The tire may be a passenger tire. The tire may be an agricultural tire, an off the road tire, a truck and bus tire, or any other tire capable of being molded in a segmented tire mold.

Mold device 400 may be a segmented tire mold comprising a plurality of mold segments, each mold segment having a radially inner surface and a radially outer surface.

Mold device 400 may have a first axial half 410 and a second axial half 415. Each of first axial half 410 and second axial half 415 may have a radially inner surface 420 configured to shape a green tire during vulcanization. Radially inner surface 420 may comprise a molding surface. Radially inner surface 420 may be a molding surface. The molding surface may be configured to mold the outer surfaces of a tire. Each radially inner surface 420 may have at least one surface feature 425 for molding specific shapes, contours, tread features, and the like into the tire. First axial half 410 and second axial half 415 may be configured to mate such that an inner cavity is created by radially inner surfaces 420.

Mold device 400 may have a first side plate 430 oriented axially outward of first axial half 410. Mold device 400 may have a second side plate 435 oriented axially outward of second axial half 415. Each of first side plate 430 and second side plate 435 may secure mold device 400 such that first axial half 410 and second axial half 415 are prevented from moving (e.g., expanding) in an axial direction while the green tire is vulcanized.

To prevent radially outward movement of first axial half 410 and second axial half 415, mold device 400 may have at least one expansion control device 460. Expansion control device 460 may prevent each of first axial half 410 and second axial half 415 from moving in a radially outward direction once installed and/or during tire vulcanization. Expansion control device 460 may substantially prevent each of first axial half 410 and second axial half 415 from moving in a radially outward direction during tire vulcanization.

Expansion control device 460 may be a ring/annulus, as illustrated in FIG. 4. Expansion control device 460 may be a plurality of rings. Expansion control device 460 may be constructed from a metal, an alloy, a composite, or any material that provides sufficient mechanical properties (e.g., a tensile strength, a corrosion resistance, a temperature resistance, a thermal expansion coefficient, and the like). Expansion control device 460 may be constructed from either a carbon steel or a stainless steel (e.g., a steel ring). Expansion control device 460 may be constructed from an aluminum, a copper, a titanium, and the like.

Expansion control device 460 may have an inner diameter that is large enough to allow expansion control device 460 to be placed circumferentially around an outer surface of the segmented tire mold. Expansion control device 460 may have an inner diameter that is large enough to allow expansion control device 460 to be placed circumferentially around an outer surface of each of first axial half 410 and second axial half 415.

Expansion control device 460 may be a ring constructed from a metal plate. Metal plate, as a raw material, may be inexpensive relative to a traditional segmented mold backing ring, which may be cast, forged, machined, laser sintered, or otherwise fabricated from metallic raw materials. Expansion control device 460 may be fabricated from a metal plate by cutting a hole in the plate, wherein the diameter of the hole is the inner diameter of expansion control device 460. One or more expansion control device 460 rings may be placed around the segmented tire mold. Expansion control device 460 may be constructed from a plurality of portions, that can be connected when expansion control device 460 is applied around an outer surface of first axial half 410 or second axial half 415.

Expansion control device 460 may be placed around the segmented tire mold, such as by sliding expansion control device 460 over the outer surface of the segmented tire mold. Expansion control device 460 may have a first portion and a second portion. The first portion of expansion control device 460 may be placed around first axial half 410. The second portion of expansion control device 460 may be placed around second axial half 415. Expansion control device 460 may prevent the mold segments from moving radially outward when a green tire is being vulcanized in the mold. Expansion control device 460 may resist an expansion of a bladder (not shown), as well as the elevated temperatures and pressures of the vulcanization process, and prevent the mold segments from moving (i.e., expanding) during vulcanization of the tire.

In order to prevent the expansion of the mold segments during vulcanization of the tire, expansion control device 460 may require a sufficient tensile strength. In order to achieve the sufficient tensile strength, expansion control device 460 may be constructed from a selection of appropriate materials, as guided by accepted engineering principles and/or practices.

Additionally, expansion control device 460 may be configured in various ways in order to achieve the desired tensile strength. For example, when expansion control device 460 is a ring, various properties of the ring may be selected to ensure that expansion control device 460 has the sufficient tensile strength for preventing the expansion of the mold segments. Such properties of the ring may include: a material, a thickness, a diameter, a number of rings to be placed around the segmented tire mold, and the like.

Expansion control device 460 may have at least one retaining ring 470. Retaining ring 470 may be oriented circumferentially around a radially outer surface of the segmented tire mold. A first retaining ring 470 may be oriented circumferentially around the radially outer surface of first axial half 410. A second retaining ring 470 may be oriented circumferentially around the radially outer surface of first axial half 415.

Retaining ring 470 may be oriented axially inward of each portion of expansion control device 460, such that a first portion of expansion control device 460 is oriented axially between retaining ring 470 and first side plate 430, and a second portion of expansion control device 460 is oriented axially between retaining ring 470 and second side plate 435. Retaining ring 470 may aid in axially securing expansion control device 460 by preventing expansion control device 460 from moving in an axial direction during vulcanization of the green tire.

Retaining ring 470 may be constructed from a metal, an alloy, a composite, or any material that provides sufficient mechanical properties (e.g., a tensile strength, a corrosion resistance, a temperature resistance, a thermal expansion coefficient, and the like). Retaining ring 470 may be constructed from either a carbon steel or a stainless steel (e.g., a steel plate). Retaining ring 470 may be constructed from an aluminum, a copper, a titanium, and the like.

Figure 5:
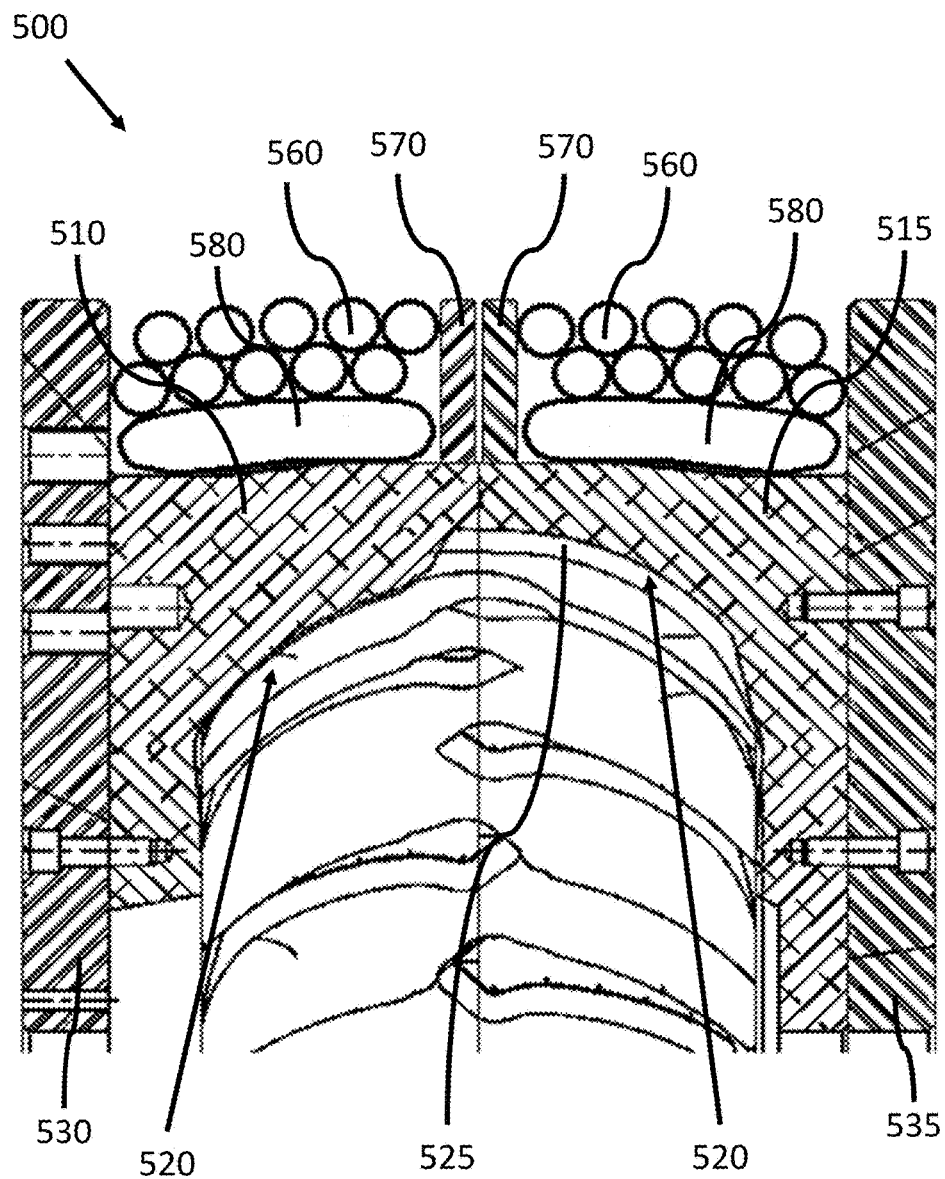
FIG. 5 illustrates a sectional view of a third embodiment of a mold device.

FIG. 5 illustrates a sectional view of a mold device 500. Mold device 500 may be configured to mold a tire (not shown). Mold device 500 may be a segmented tire mold. The tire may be a pneumatic tire. The tire may be a passenger tire. The tire may be an agricultural tire, an off the road tire, a truck and bus tire, or any other tire capable of being molded in a segmented tire mold.

Mold device 500 may be a segmented tire mold comprising a plurality of mold segments, each mold segment having a radially inner surface and a radially outer surface.

Mold device 500 may have a first axial half 510 and a second axial half 515. Each of first axial half 510 and second axial half 515 may have a radially inner surface 520 configured to shape a green tire during vulcanization. Radially inner surface 520 may comprise a molding surface. Radially inner surface 520 may be a molding surface. The molding surface may be configured to mold the outer surfaces of a tire. Each radially inner surface 520 may have at least one surface feature 525 for molding specific shapes, contours, tread features, and the like into the tire. First axial half 510 and second axial half 515 may be configured to mate such that an inner cavity is created by radially inner surface 520.

Mold device 500 may have a first side plate 530 oriented axially outward of first axial half 510. Mold device 500 may have a second side plate 535 oriented axially outward of second axial half 515. Each of first side plate 530 and second side plate 535 may secure mold device 500 such that first axial half 510 and second axial half 515 are prevented from moving (e.g., expanding) in an axial direction while the green tire is vulcanized.

To prevent radially outward movement of first axial half 510 and second axial half 515, mold device 500 may have at least one expansion control device 560. Expansion control device 560 may prevent each of first axial half 510 and second axial half 515 from moving in a radially outward direction once installed and/or during tire vulcanization. Expansion control device 560 may substantially prevent each of first axial half 510 and second axial half 515 from moving in a radially outward direction during tire vulcanization.

Expansion control device 560 may be a cable, as illustrated in FIG. 5. Expansion control device 560 may be a plurality of cables. Expansion control device 560 may be constructed from a metal, an alloy, a composite, or any material that provides sufficient mechanical properties (e.g., a tensile strength, a corrosion resistance, a temperature resistance, a thermal expansion coefficient, and the like). Expansion control device 560 may be constructed from either a carbon steel or a stainless steel (e.g., a steel cable). Expansion control device 560 may be constructed from an aluminum, a copper, a titanium, and the like.

Expansion control device 560 may be capable of forming an inner diameter that is large enough to allow expansion control device 560 to be placed circumferentially around an outer surface of the segmented tire mold. Expansion control device 560 may be capable of forming an inner diameter that is large enough to allow expansion control device 560 to be placed circumferentially around an outer surface of each of first axial half 510 and second axial half 515.

Expansion control device 560 may be wrapped around the segmented tire mold, such as by circumferentially winding expansion control device 560 around the outer surface of the segmented tire mold at least one revolution (e.g., similar to a thread wound on a spool, or a hose wound on a reel). Expansion control device 560 may be wrapped around each of first axial half 510 and second axial half 515.

Expansion control device 560 may be placed around the segmented tire mold. Expansion control device 560 may have a first portion and a second portion. The first portion of expansion control device 560 may be placed around first axial half 510. The second portion of expansion control device 560 may be placed around second axial half 515. Expansion control device 560 may prevent the mold segments from moving radially outward when a green tire is being vulcanized in the mold. Expansion control device 560 may resist an expansion of a bladder (not shown), as well as the elevated temperatures and pressures of the vulcanization process, and prevent the mold segments from moving (i.e., expanding) during vulcanization of the tire.

In order to prevent the expansion of the mold segments during vulcanization of the tire, expansion control device 560 may require a sufficient tensile strength. In order to achieve the sufficient tensile strength, expansion control device 560 may be constructed from a selection of appropriate materials, as guided by accepted engineering principles and/or practices.

Additionally, expansion control device 560 may be configured in various ways in order to achieve the desired tensile strength. For example, when expansion control device 560 is a cable, various properties of the cable may be selected to ensure that expansion control device 560 has the sufficient tensile strength for preventing the expansion of the mold segments. Such properties of the cable may include: a material, a construction geometry, a diameter, a length, a number of windings around the segmented tire mold, and the like. Furthermore, expansion control device 560 may be wrapped around the segmented tire mold and tightened (e.g., by a hand, by a wrench, by a winch, or by any other device that provides a mechanical advantage) to a force calculated to prevent expansion of the mold segments.

Expansion control device 560 may have at least one retaining ring 570. Retaining ring 570 may be oriented circumferentially around a radially outer surface of the segmented tire mold. A first retaining ring 570 may be oriented circumferentially around the radially outer surface of first axial half 510. A second retaining ring 570 may be oriented circumferentially around the radially outer surface of first axial half 515.

Retaining ring 570 may be oriented axially inward of each portion of expansion control device 560, such that a first portion of expansion control device 560 is oriented axially between retaining ring 570 and first side plate 530, and a second portion of expansion control device 560 is oriented axially between retaining ring 570 and second side plate 535. Retaining ring 570 may aid in axially securing expansion control device 560 by preventing expansion control device 560 from moving in an axial direction during vulcanization of the green tire.

Retaining ring 570 may be constructed from a metal, an alloy, a composite, or any material that provides sufficient mechanical properties (e.g., a tensile strength, a corrosion resistance, a temperature resistance, a thermal expansion coefficient, and the like). Retaining ring 570 may be constructed from either a carbon steel or a stainless steel (e.g., a steel plate). Retaining ring 570 may be constructed from an aluminum, a copper, a titanium, and the like.

Mold device 500 may have at least one tension bladder 580. Tension bladder 580 may extend circumferentially around the segmented tire mold. Tension bladder 580 may have a substantially hollow body with a port permitting pressurization of the interior of the body with a fluid, such as a gas, a liquid, or the like, resulting in expansion of tension bladder 580. Tension bladder 580 may be oriented radially between the segmented tire mold and expansion control device 560. Tension bladder 580 may be oriented axially between the side plates and the retaining rings. For example, a first tension bladder 580 may be oriented both a) radially between first axial half 510 and the first portion of expansion control device 560, and b) axially between first side plate 530 and first retaining ring 570. Likewise, a second tension bladder 580 may be oriented both a) radially between second axial half 515 and the second portion of expansion control device 560, and b) axially between second side plate 535 and second retaining ring 570.

Tension bladder 580 may increase the tension in expansion control device 560 when tension bladder 580 is expanded. Expanding tension bladder 580 may assist in tightening the fit of expansion control device 560 against the segmented tire mold. Expanding tension bladder 580 may impart radial forces onto expansion control device 560 and the segmented tire mold. Expanding bladder 580 may cause an increase in tension in expansion control device 560, which may result in an increase in normal forces (radially oriented) into the segmented tire mold. A tighter fit may assist in preventing the mold segments of the segmented tire mold from expanding radially outward during vulcanization of the tire. The expansion of tension bladder 580 may be adjusted to fill a void between the segmented tire mold and expansion control device 560, thus allowing for looser manufacturing tolerances of expansion control device 560 (i.e., reduced manufacturing costs).

Tension bladder 580 may be a bag-like or a balloon-like device capable of holding an internal fluid under pressure. Internal fluids may include a gas or a liquid, such as air, water, a hydraulic oil, or any other gas or liquid suitable for causing an expansion in tension bladder 580 when pressurized.

Tension bladder 580 may be constructed from materials that provide at least one of: a vapor or a fluid barrier, a tensile or a compressive strength, an abrasion resistance, a thermal conduction or resistance, and the like. Tension bladder 580 may be constructed from any material suitable for being subjected to the elevated temperatures and pressures of vulcanization. Tension bladder 580 may be constructed from at least one of: a rubber, a thermoplastic, a polymer, an elastomer, a fabric, a metal, a composite, and the like.

Figure 6:
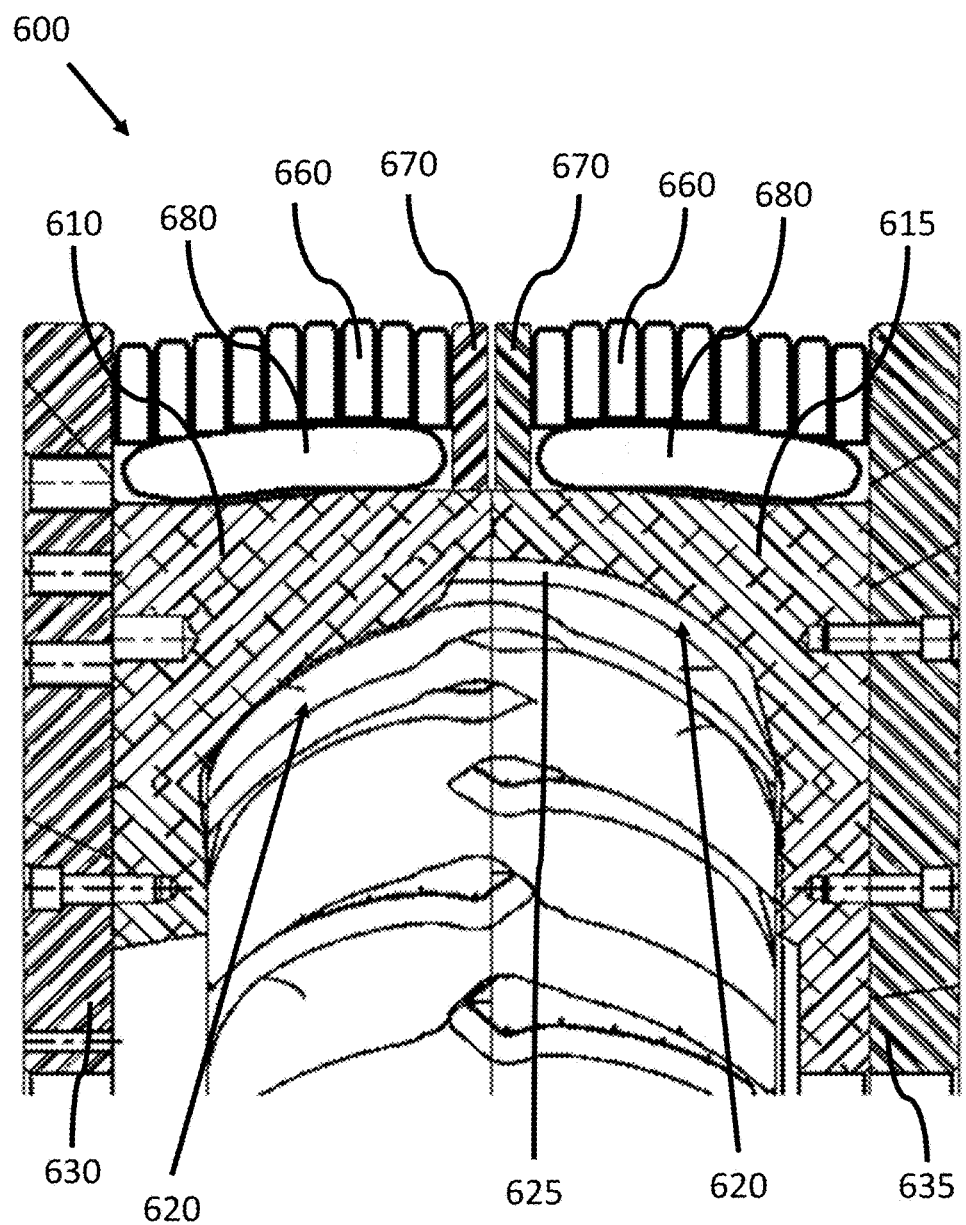
FIG. 6 illustrates a sectional view of a fourth embodiment of a mold device.

FIG. 6 illustrates a sectional view of a mold device 600. Mold device 600 may be configured to mold a tire (not shown). Mold device 600 may be a segmented tire mold. The tire may be a pneumatic tire. The tire may be a passenger tire. The tire may be an agricultural tire, an off the road tire, a truck and bus tire, or any other tire capable of being molded in a segmented tire mold.

Mold device 600 may be a segmented tire mold comprising a plurality of mold segments, each mold segment having a radially inner surface and a radially outer surface.

Mold device 600 may have a first axial half 610 and a second axial half 615. Each of first axial half 610 and second axial half 615 may have a radially inner surface 620 configured to shape a green tire during vulcanization. Radially inner surface 620 may comprise a molding surface. Radially inner surface 620 may be a molding surface. The molding surface may be configured to mold the outer surfaces of a tire. Each radially inner surface 620 may have at least one surface feature 625 for molding specific shapes, contours, tread features, and the like into the tire. First axial half 610 and second axial half 615 may be configured to mate such that an inner cavity is created by radially inner surface 620.

Mold device 600 may have a first side plate 630 oriented axially outward of first axial half 610. Mold device 600 may have a second side plate 635 oriented axially outward of second axial half 615. Each of first side plate 630 and second side plate 635 may secure mold device 600 such that first axial half 610 and second axial half 615 are prevented from moving (e.g., expanding) in an axial direction while the green tire is vulcanized.

To prevent radially outward movement of first axial half 610 and second axial half 615, mold device 600 may have at least one expansion control device 660. Expansion control device 660 may prevent each of first axial half 610 and second axial half 615 from moving in a radially outward direction once installed and/or during tire vulcanization. Expansion control device 660 may substantially prevent each of first axial half 610 and second axial half 615 from moving in a radially outward direction during tire vulcanization.

Expansion control device 660 may be a ring/annulus, as illustrated in FIG. 6. Expansion control device 660 may be a plurality of rings. Expansion control device 660 may be constructed from a metal, an alloy, a composite, or any material that provides sufficient mechanical properties (e.g., a tensile strength, a corrosion resistance, a temperature resistance, a thermal expansion coefficient, and the like). Expansion control device 660 may be constructed from either a carbon steel or a stainless steel (e.g., a steel ring). Expansion control device 660 may be constructed from an aluminum, a copper, a titanium, and the like.

Expansion control device 660 may have an inner diameter that is large enough to allow expansion control device 660 to be placed circumferentially around an outer surface of the segmented tire mold. Expansion control device 660 may have an inner diameter that is large enough to allow expansion control device 660 to be placed circumferentially around an outer surface of each of first axial half 610 and second axial half 615.

Expansion control device 660 may be a ring constructed from a metal plate. Metal plate, as a raw material, may be inexpensive relative to a traditional segmented mold backing ring, which may be cast, forged, machined, laser sintered, or otherwise fabricated from metallic raw materials. Expansion control device 660 may be fabricated from a metal plate by cutting a hole in the plate, wherein the diameter of the hole is the inner diameter of expansion control device 660. One or more expansion control device 660 rings may be placed around the segmented tire mold.

Expansion control device 660 may be placed around the segmented tire mold, such as by sliding expansion control device 660 over the outer surface of the segmented tire mold. Expansion control device 660 may have a first portion and a second portion. The first portion of expansion control device 660 may be placed around first axial half 610. The second portion of expansion control device 660 may be placed around second axial half 615. Expansion control device 660 may prevent the mold segments from moving radially outward when a green tire is being vulcanized in the mold. Expansion control device 660 may resist an expansion of a bladder (not shown), as well as the elevated temperatures and pressures of the vulcanization process, and prevent the mold segments from moving (i.e., expanding) during vulcanization of the tire.

In order to prevent the expansion of the mold segments during vulcanization of the tire, expansion control device 660 may require a sufficient tensile strength. In order to achieve the sufficient tensile strength, expansion control device 660 may be constructed from a selection of appropriate materials, as guided by accepted engineering principles and/or practices.

Additionally, expansion control device 660 may be configured in various ways in order to achieve the desired tensile strength. For example, when expansion control device 660 is a ring, various properties of the ring may be selected to ensure that expansion control device 660 has the sufficient tensile strength for preventing the expansion of the mold segments. Such properties of the ring may include: a material, a thickness, a diameter, a number of rings to be placed around the segmented tire mold, and the like.

Expansion control device 660 may have at least one retaining ring 670. Retaining ring 670 may be oriented circumferentially around a radially outer surface of the segmented tire mold. A first retaining ring 670 may be oriented circumferentially around the radially outer surface of first axial half 610. A second retaining ring 670 may be oriented circumferentially around the radially outer surface of first axial half 615.

Retaining ring 670 may be oriented axially inward of each portion of expansion control device 660, such that a first portion of expansion control device 660 is oriented axially between retaining ring 670 and first side plate 630, and a second portion of expansion control device 660 is oriented axially between retaining ring 670 and second side plate 635. Retaining ring 670 may aid in axially securing expansion control device 660 by preventing expansion control device 660 from moving in an axial direction during vulcanization of the green tire.

Retaining ring 670 may be constructed from a metal, an alloy, a composite, or any material that provides sufficient mechanical properties (e.g., a tensile strength, a corrosion resistance, a temperature resistance, a thermal expansion coefficient, and the like). Retaining ring 670 may be constructed from either a carbon steel or a stainless steel (e.g., a steel plate). Retaining ring 670 may be constructed from an aluminum, a copper, a titanium, and the like.

Mold device 600 may have at least one tension bladder 680. Tension bladder 680 may extend circumferentially around the segmented tire mold. Tension bladder 680 may have a substantially hollow body with a port permitting pressurization of the interior of the body with a fluid, such as a gas, a liquid, or the like, resulting in expansion of tension bladder 680. Tension bladder 680 may be oriented radially between the segmented tire mold and expansion control device 660. Tension bladder 680 may be oriented axially between the side plates and the retaining rings. For example, a first tension bladder 680 may be oriented both a) radially between first axial half 610 and the first portion of expansion control device 660, and b) axially between first side plate 630 and first retaining ring 670. Likewise, a second tension bladder 680 may be oriented both a) radially between second axial half 615 and the second portion of expansion control device 660, and b) axially between second side plate 635 and second retaining ring 670.

Tension bladder 680 may increase the tension in expansion control device 660 when tension bladder 680 is expanded. Expanding tension bladder 680 may assist in tightening the fit of expansion control device 660 against the segmented tire mold. Expanding tension bladder 680 may put radial forces onto expansion control device 660 and the segmented tire mold. Expanding bladder 680 may cause an increase in tension in expansion control device 660, which may result in an increase in normal forces (radially oriented) into the segmented tire mold. A tighter fit may assist in preventing the mold segments of the segmented tire mold from expanding radially outward during vulcanization of the tire. The expansion of tension bladder 680 may be adjusted to fill a void between the segmented tire mold and expansion control device 660, thus allowing for looser manufacturing tolerances of expansion control device 660 (i.e., reduced manufacturing costs).

Tension bladder 680 may be a bag-like or a balloon-like device capable of holding an internal fluid under pressure. Internal fluids may include a gas or a liquid, such as air, water, a hydraulic oil, or any other gas or liquid suitable for being pressurized and causing an expansion in tension bladder 680.

Tension bladder 680 may be constructed from materials that provide at least one of: a vapor or a fluid barrier, a tensile or a compressive strength, an abrasion resistance, a thermal conduction or resistance, and the like. Tension bladder 680 may be constructed from any material suitable for being subjected to the elevated temperatures and pressures of vulcanization. Tension bladder 680 may be constructed from at least one of: a rubber, a thermoplastic, a polymer, an elastomer, a fabric, a metal, a composite, and the like.

Figure 7:
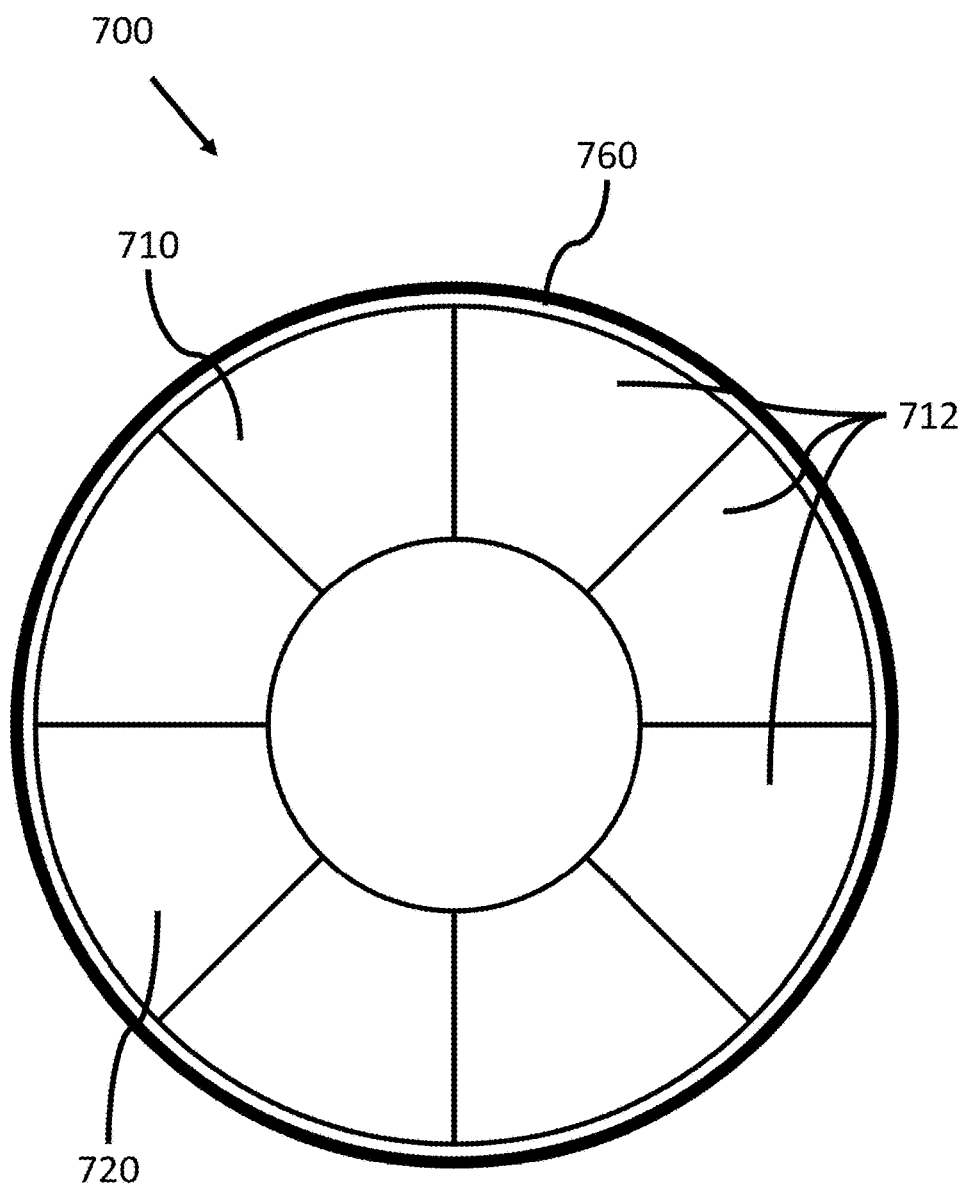
FIG. 7 illustrates an elevational view of a specific elements of a mold device.

FIG. 7 illustrates an elevational view of a portion of a mold device 700. Mold device 700 may be configured to mold a tire (not shown). Mold device 700 may be a segmented mold, comprising a plurality of mold segments 712. Mold device 700 may include a first axial half 710. First axial half 710 may include a radially inner surface 720. Radially inner surface 720 may be formed from the radially inner surfaces of each mold segment 712. An expansion control device 760 may be oriented circumferentially around, and radially-outwardly of, the plurality of mold segments 712. A radially inner surface of expansion control device 760 may be oriented circumferentially around, and radially-outwardly of, the radially outer surface of mold segments 712.

Figure 8:
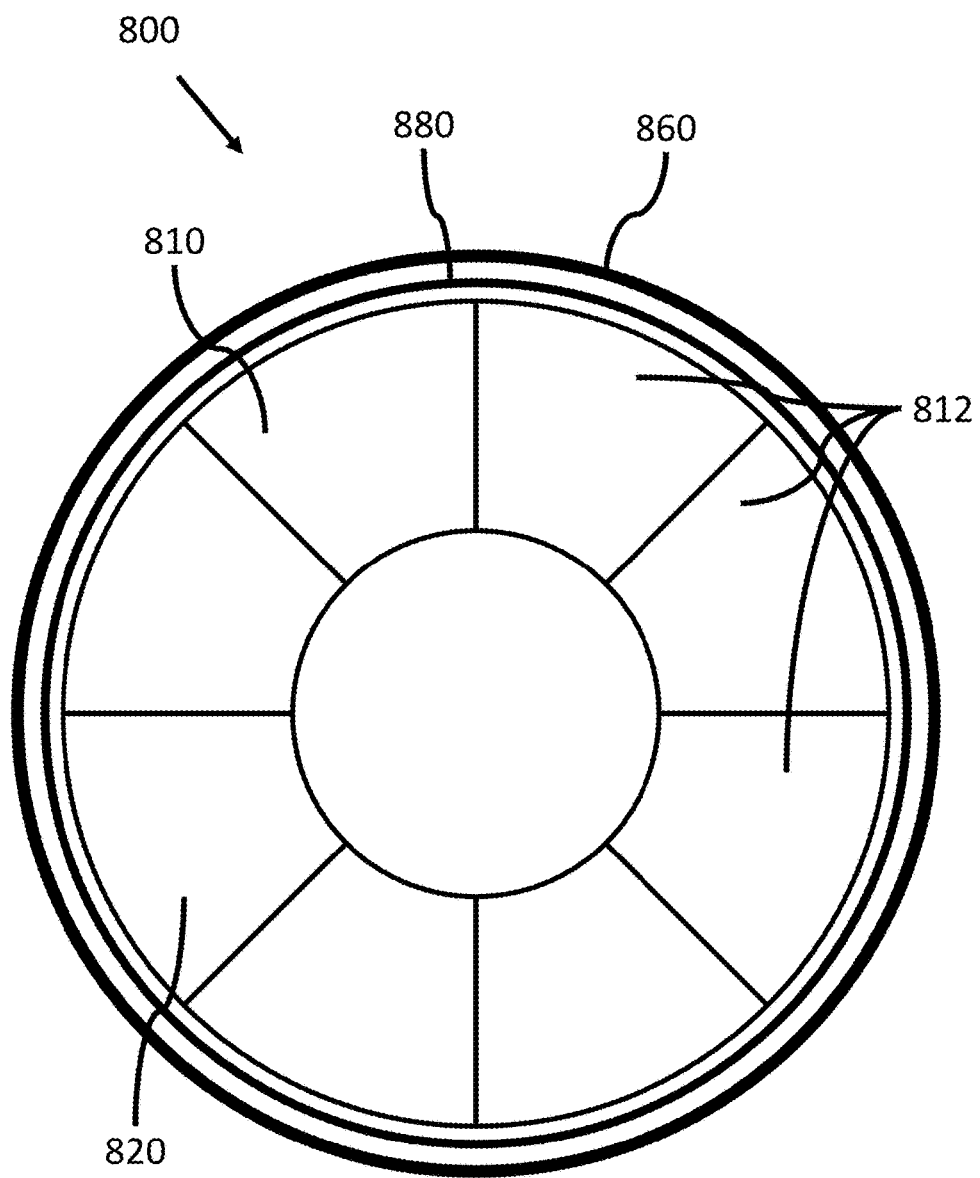
FIG. 8 illustrates an elevational view of a specific elements of a mold device.

FIG. 8 illustrates an elevational view of a portion of a mold device 800. Mold device 800 may be configured to mold a tire (not shown). Mold device 800 may be a segmented mold, comprising a plurality of mold segments 812. Mold device 800 may include a first axial half 810. First axial half 810 may include a radially inner surface 820. Radially inner surface 820 may be formed from the radially inner surfaces of each mold segment 812. An expansion control device 860 may be oriented circumferentially around, and radially-outwardly of, the plurality of mold segments 812. An expanding tension bladder 880 may be oriented circumferentially around, and radially-outwardly of, the plurality of mold segments 812, but radially inwardly of expansion control device 860. A radially inner surface of expansion control device 860 may be oriented circumferentially around, and radially-outwardly of, the radially outer surface of mold segments 812.

Tension bladder 880 may have a radially inner surface and a radially outer surface. The radially inner surface of tension bladder 880 may be oriented circumferentially around, and radially-outwardly of, the radially outer surface of mold segments 812. The radially inner surface of expansion control device 860 may be oriented circumferentially around, and radially-outwardly of, the radially outer surface of tension bladder 880.

Tension bladder 880 may be configured to be expandable in volume, wherein expansion in the volume of tension bladder 880 may place expansion control device 860 in tension. Tension bladder 880 may act as a bridge, or linkage, thus transmitting forces from expansion control device 860 into mold segments 812.

Figure 9:
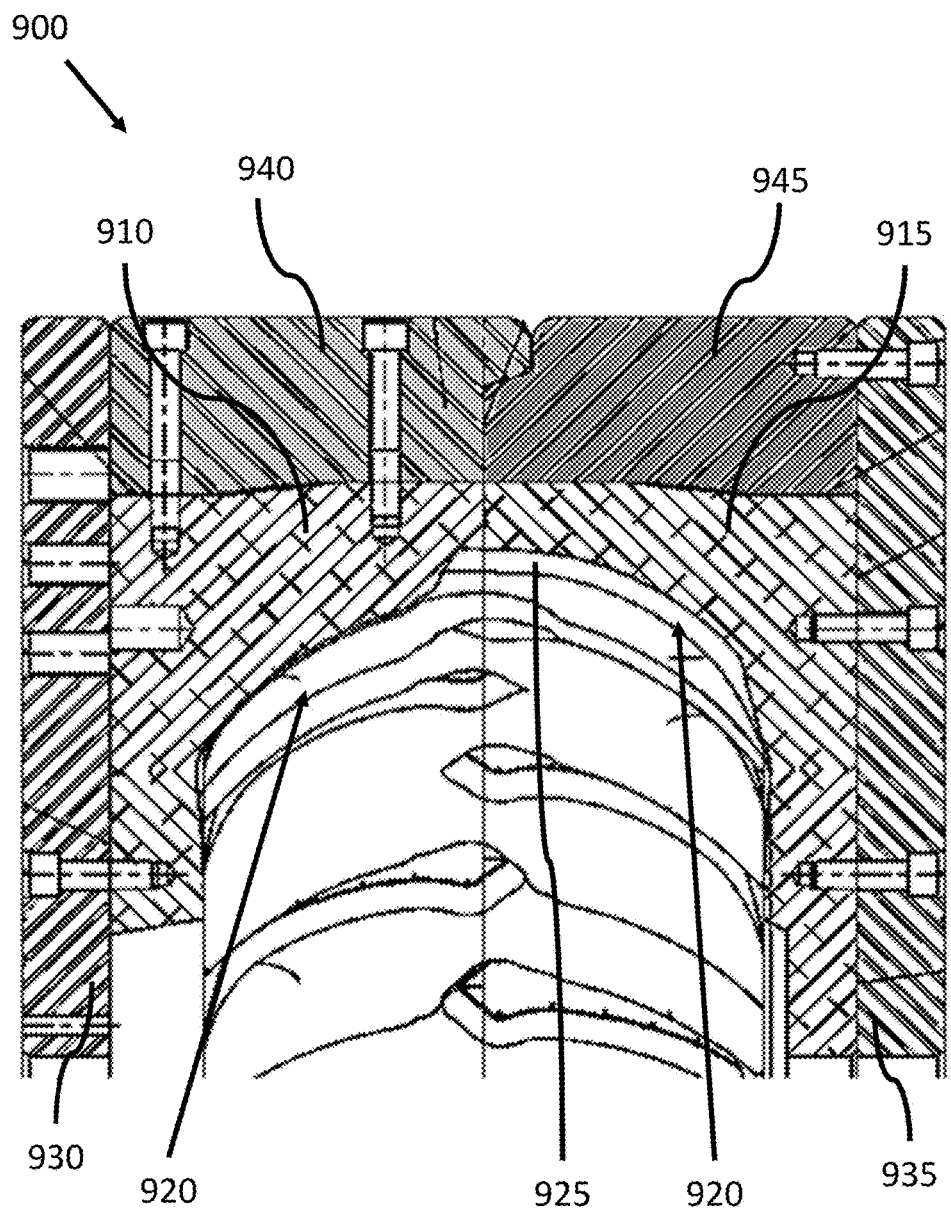
FIG. 9 illustrates a sectional view of a prior art segmented tire mold.

FIG. 9 illustrates a sectional view of a prior art segmented tire mold 900. Segmented tire mold 900 may be configured to mold a tire (not shown).

Prior art segmented tire mold 900 may have a first axial half 910 and a second axial half 915. Each of first axial half 910 and second axial half 915 may have a radially inner surface 920 configured to shape a green tire during vulcanization. Each radially inner surface 920 may have at least one surface feature 925 for molding specific shapes, contours, tread features, and the like into the tire. First axial half 910 and second axial half 915 may be configured to mate such that an inner cavity is created by radially inner surface 920.

Prior art segmented tire mold 900 may have a first side plate 930 oriented axially outward of first axial half 910. Prior art segmented tire mold 900 may have a second side plate 935 oriented axially outward of second axial half 915.

To prevent radially outward movement of first axial half 910 and second axial half 915, prior art segmented tire mold 900 may have a first backing ring 940 and a second backing ring 945. First backing ring 940 may prevent first axial half 910 from moving in a radially outward direction during tire vulcanization, while second backing ring 945 may prevent second axial half 915 from moving in a radially outward direction during tire vulcanization.

Example 1

A segmented tire mold may include an expansion control device applied about its outer surface, with or without the use of a tension bladder oriented between the expansion control device and the outer surface of the segmented tire mold. Such devices are illustrated in FIGS. 3-8 and described above.

The segmented tire mold has an inner diameter of 80.00 in. (203.20 cm), and an outer diameter of 82.35 in. (209.17 cm). The segmented tire mold with an expansion control device installed was analyzed as a thick walled cylinder. A pressure of 500.00 psi (3.45 MPa) was applied to the interior of the tire mold via the heat and pressure applied during vulcanization. A counter-pressure of 500.00 psi (3.45 MPa) was applied to the exterior of the tire mold via the expansion control device. Where the expansion control device is a wrapped cable, the radially oriented counter-pressure of 500.00 psi (3.45 MPa) was created through tensioning of the cable to about 17,000.00 psi (117.21 MPa).

As a result, axial stresses in the wall of the segmented tire mold would be about 500 psi (3.45 MPa) in compression. Circumferential/hoop stresses in the wall of the segmented tire mold would be about 500 psi (3.45 MPa) in compression. Radial stresses in the wall of the segmented tire mold would be about 500 psi (3.45 MPa) in compression. Stresses oriented in this arrangement are desirable as the segmented tire mold components remain in compression, even when pressured from within to what may be maximum design pressure (500 psi (3.45 MPa)).

Example 2

A prior art segmented tire mold may be arranged without an expansion control device applied about its outer surface. Such a device is illustrated in FIG. 9 and described above.

The segmented tire mold has an inner diameter of 80.00 in. (203.20 cm), and an outer diameter of 82.35 in. (209.17 cm). The segmented tire mold was analyzed as a thick walled cylinder. A pressure of 500.00 psi (3.45 MPa) was applied to the interior of the tire mold via the heat and pressure applied during vulcanization. As no expansion control device was in place, no counter-pressure of 500.00 psi (3.45 MPa) was applied to the exterior of the tire mold.

As a result, axial stresses in the wall of the segmented tire mold would be about 8,387.00 psi (57.83 MPa) in tension. Circumferential/hoop stresses in the wall of the segmented tire mold would be about 17,275 psi (119.11 MPa) in tension. Radial stresses in the wall of the segmented tire mold would be about 500 psi (3.45 MPa) in compression. Stresses oriented in this arrangement are undesirable as the segmented tire mold components are in tension for the most part when under pressure from within to what may be maximum design pressure (500 psi (3.45 MPa)).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing, which in one embodiment is ±6.35 millimeters (±0.25 inches). To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A mold device for a pneumatic tire, comprising:
    a segmented tire mold comprising:
        a plurality of mold segments each having a radially inner surface and a radially outer surface, wherein the radially inner surface of each mold segment has a molding surface, and
        a first axial half and a second axial half; and
    at least one expansion control device having:
        a radially inner surface,
        a first portion oriented circumferentially around, and radially-outward of, the radially outer surface of the first axial half of the segmented tire mold,
        a second portion oriented circumferentially around, and radially-outward of, the radially outer surface of the second axial half of the segmented tire mold,
        a first side plate secured to an axially outer surface of the first axial half of the segmented tire mold,
        a second side plate secured to an axially outer surface of the second axial half of the segmented tire mold,
        a first retaining ring oriented circumferentially around a radially outer surface of the first axial half of the segmented tire mold, and
        a second retaining ring oriented circumferentially around a radially outer surface of the second axial half of the segmented tire mold;
    wherein the first portion of the expansion control device is oriented axially between the first side plate and the first retaining ring,
    wherein the second portion of the expansion control device is oriented axially between the second side plate and the second retaining ring,
    wherein the radially inner surface of the expansion control device is oriented circumferentially around, and radially outwardly of, the radially outer surface of the mold segments,
    wherein the expansion control device applies a force radially inwardly to the mold segments, and
    wherein the expansion control device is a cable.

2. The mold device of claim 1, wherein the cable is wrapped circumferentially around the mold segments at least one revolution.

3. The mold device of claim 1, further comprising:
    at least one tension bladder having a radially inner surface and a radially outer surface,
    wherein the radially inner surface of the tension bladder is oriented circumferentially around, and radially outwardly of, the radially outer surface of the mold segments, and
    wherein the radially inner surface of the expansion control device is oriented circumferentially around, and radially outwardly of, the radially outer surface of the tension bladder.

4. A mold device for a pneumatic tire, comprising:
    a segmented tire mold comprising:
        a plurality of mold segments each having a radially inner surface and a radially outer surface, wherein the radially inner surface of each mold segment has a molding surface, and
        a first axial half and a second axial half; and
    at least one expansion control device having:
        a radially inner surface,
        a first portion oriented circumferentially around, and radially-outward of, the radially outer surface of the first axial half of the segmented tire mold,
        a second portion oriented circumferentially around, and radially-outward of, the radially outer surface of the second axial half of the segmented tire mold,
        a first side plate secured to an axially outer surface of the first axial half of the segmented tire mold,
        a second side plate secured to an axially outer surface of the second axial half of the segmented tire mold,
        a first retaining ring oriented circumferentially around a radially outer surface of the first axial half of the segmented tire mold, and
        a second retaining ring oriented circumferentially around a radially outer surface of the second axial half of the segmented tire mold;
    wherein the first portion of the expansion control device is oriented axially between the first side plate and the first retaining ring,
    wherein the second portion of the expansion control device is oriented axially between the second side plate and the second retaining ring,
    wherein the radially inner surface of the expansion control device is oriented circumferentially around, and radially outwardly of, the radially outer surface of the mold segments,
    wherein the expansion control device applies a force radially inwardly to the mold segments, and
    wherein the expansion control device is at least one ring.

5. The mold device of claim 4, wherein the expansion control device is a plurality of rings oriented circumferentially around the segmented tire mold.

6. The mold device of claim 4, further comprising:
    at least one tension bladder having a radially inner surface and a radially outer surface,
    wherein the radially inner surface of the tension bladder is oriented circumferentially around, and radially outwardly of, the radially outer surface of the mold segments, and
    wherein the radially inner surface of the expansion control device is oriented circumferentially around, and radially outwardly of, the radially outer surface of the tension bladder.

7. A mold device for a pneumatic tire, comprising:
a segmented tire mold comprising:
- a plurality of mold segments each having a radially inner surface and a radially outer surface, wherein the radially inner surface of each mold segment has a molding surface,
- a first axial half, and
- a second axial half;

at least one expansion control device having a radially inner surface comprising:
- a first portion, and
- a second portion; and a first tension bladder having a radially inner surface and a radially outer surface;
- wherein the first tension bladder is oriented circumferentially around the radially outer surface of the first axial half of the segmented tire mold;

a second tension bladder having a radially inner surface and a radially outer surface,
- wherein the second tension bladder is oriented circumferentially around the radially outer surface of the second axial half of the segmented tire mold wherein the radially inner surface of the first and second tension bladders is oriented circumferentially around, and radially outwardly of, the radially outer surface of the mold segments, wherein the radially inner surface of the expansion control device is oriented circumferentially around, and radially outwardly of, the radially outer surface of the first and second tension bladders, wherein the first portion of the expansion control device is oriented circumferentially around, and radially-outwardly of, the radially outer surface of the first tension bladder, wherein the second portion of the expansion control device is oriented circumferentially around, and radially-outwardly of, the radially outer surface of the second tension bladder, wherein the expansion control device applies a force radially inwardly to the mold segments, wherein the tension bladder is configured to be expandable in volume, wherein expansion in volume of the tension bladder places the expansion control device in tension, and wherein the expansion control device is at least one of: a cable and a ring.

8. The mold device of claim 7, wherein the expansion control device is a cable wrapped circumferentially around the mold segments at least one revolution.

9. The mold device of claim 7, wherein the expansion control device is a plurality of rings oriented circumferentially around the segmented tire mold.

10. The mold device of claim 7, wherein the mold device further comprises: a first side plate and a second side plate,
- wherein the first side plate is secured to an axially outer surface of the first axial half of the segmented tire mold, and
- wherein the second side plate is secured to an axially outer surface of the second axial half of the segmented tire mold; and
- wherein the expansion control device further comprises a first retaining ring and a second retaining ring,
- wherein the first retaining ring is oriented circumferentially around a radially outer surface of the first axial half of the segmented tire mold, and
- wherein the second retaining ring is oriented circumferentially around a radially outer surface of the second axial half of the segmented tire mold; and
- wherein both the first portion of the expansion control device and the first tension bladder are oriented axially between the first side plate and the first retaining ring, and
- wherein both the second portion of the expansion control device and the second tension bladder are oriented axially between the second side plate and the second retaining ring.

* * * * *